United States Patent
Smith

(10) Patent No.: US 9,225,498 B2
(45) Date of Patent: Dec. 29, 2015

(54) METHOD AND SYSTEM FOR PROVIDING DIVERSE MULTIPLE CARRIER AGGREGATION

(71) Applicant: Clint Smith, Warwick, NY (US)

(72) Inventor: Clint Smith, Warwick, NY (US)

(73) Assignee: RIVADA NETWORKS LLC, Colorado Springs, CO (US)

( * ) Notice: Subject to any disclaimer, the term of this patent is extended or adjusted under 35 U.S.C. 154(b) by 100 days.

(21) Appl. No.: 13/910,790

(22) Filed: Jun. 5, 2013

(65) Prior Publication Data

US 2013/0322309 A1    Dec. 5, 2013

Related U.S. Application Data

(60) Provisional application No. 61/689,382, filed on Jun. 5, 2012.

(51) Int. Cl.
*H04L 5/14* (2006.01)

(52) U.S. Cl.
CPC .......................................... *H04L 5/14* (2013.01)

(58) Field of Classification Search
USPC ......... 370/273–282, 297, 310; 455/73, 77–78
See application file for complete search history.

(56) References Cited

U.S. PATENT DOCUMENTS

| | | | |
|---|---|---|---|
| 6,574,459 B1 | 6/2003 | Kaminski et al. | |
| 7,280,810 B2 * | 10/2007 | Feher | 455/137 |
| 7,376,440 B2 | 5/2008 | Forrester et al. | |
| 8,892,057 B2 * | 11/2014 | Khlat | 455/78 |
| 2004/0166803 A1 | 8/2004 | Moloudi et al. | |
| 2005/0148312 A1 | 7/2005 | Toncich et al. | |
| 2008/0220787 A1 | 9/2008 | Stanwood | |
| 2009/0203396 A1 | 8/2009 | Zhitnitsky | |
| 2010/0130218 A1 | 5/2010 | Zhang et al. | |
| 2010/0158147 A1 | 6/2010 | Zhang et al. | |
| 2010/0272064 A1 | 10/2010 | Chen | |
| 2010/0303011 A1 | 12/2010 | Pan et al. | |
| 2011/0182207 A1 | 7/2011 | Naito et al. | |

(Continued)

FOREIGN PATENT DOCUMENTS

| | | |
|---|---|---|
| WO | WO 2010/048142 | 4/2010 |
| WO | WO 2010/048178 | 4/2010 |

OTHER PUBLICATIONS

Brochure, "TriQuint Semiconductor Mobile Device", 2012, 10 pages.

(Continued)

*Primary Examiner* — Frank Duong
(74) *Attorney, Agent, or Firm* — Brinks Gilson & Lione

(57) ABSTRACT

Embodiments of systems and methods are presented to provide diverse multiple channel aggregation for wireless broadband edge devices with existing wireless technologies. A method and apparatus for supporting aggregation of multiple diverse RF carriers are disclosed. A wireless edge device capable of transmit and receiving on multiple diverse RF carriers using one or multiple wireless standards A wireless edge device may utilize carrier aggregation using the same radio access scheme with different frequency bands and possibly different rf bandwidths. Additionally a wireless edge device which can utilize different radio access schemes with different frequency bands. The radio access scheme and the frequency bands that the wireless edge device can use may be provided by one wireless network operator or by multiple wireless network operators.

31 Claims, 17 Drawing Sheets

(56) References Cited

U.S. PATENT DOCUMENTS

| | | | |
|---|---|---|---|
| 2012/0040687 A1 | 2/2012 | Siomina et al. | |
| 2012/0063358 A1 | 3/2012 | Etemad | |
| 2012/0083309 A1 | 4/2012 | Kwon et al. | |
| 2012/0140804 A1 | 6/2012 | Corral | |
| 2012/0281597 A1* | 11/2012 | Khlat et al. | 370/277 |
| 2013/0250819 A1* | 9/2013 | Khlat et al. | 370/278 |

OTHER PUBLICATIONS

Technical Report, "3GPP TR 36.942 V.1.0.0, Release 8", Feb. 2007, 56 pages.
Technical Report, "3GPP TR 36.815 V9.1.0, Release 9", Jun. 2010, 29 pages.
Technical Specification, "ETSI TS 134.114 V8.2.0, Release 8", Oct. 2009, 60 pages.
International Preliminary Report on Patentability for PCT Application No. PCT/US2013/44286, dated Jun. 24, 2014, 6 pgs.
International Search Report and Written Opinion for PCT/US2013/044286 dated Sep. 20, 2013, 9 pages.
Wilkinson Power Divider Splitter Combiner, accessed on the internet on Jun. 12, 2015 at http://www.radio-electronics.com/info/rf-technology-design/coupler-combiner-splitter/wilkinson-splitter-combiner-divider.php, 9 pages.
RF Hybrid Combiner, Splitter and Divider, accessed on the internet on Jun. 12, 2015 at http://www.radio-electronics.com/info/rf-technology-design/coupler-combiner-splitter/rf-hybrid-power-combiner-splitter-divider.php, 7 pages.
Antenna Diplexer Tutorial, accessed on the internet on Jun. 12, 2015 at http://www.radio-electronics.com/info/antennas/diplexer/antenna-rf-diplexer.php, 8 pages.

* cited by examiner

METHOD AND SYSTEM FOR PROVIDING DIVERSE MULTIPLE CARRIER AGGREGATION

RELATED APPLICATIONS

This application claims the benefit of U.S. Provisional Patent Application No. 61/689,382, filed Jun. 5, 2012, which is hereby incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention relates generally to a wireless mobile communication system, and more particularly to methods and systems which provides diverse multiple carrier aggregation.

BACKGROUND

Wireless fixed and mobile communication systems keep evolving providing an ever increasing need for data bandwidth. To enable the delivery of increased data bandwidth the use of use of improved radio access and modulation schemes are being utilized. However RF spectrum is a limited resource and further improvements in modulation schemes will not solve the need for higher data bandwidths. Therefore Wireless fixed and mobile communication systems in order to provide improved data bandwidth may use multiple carriers for the transmission and/or reception of data.

Wireless communication is a virtual necessity in today's society as people increasingly use cordless phones, cellular phones, wireless data communication devices, and the like on a daily basis. The ability to communicate wirelessly has become pervasive in homes, businesses, retail establishments, and in the outdoors generally. Consequently, people can now communicate while in transit and in almost any environment.

Wireless communication involves the use of a limited resource: the electromagnetic spectrum. Different wireless communication schemes utilize different bands or segments of the electromagnetic spectrum in different manners. Typically, each particular segment of the electromagnetic spectrum is utilized in accordance with a wireless standard that has been created by a government entity, an industry consortium, and/or some other regulatory body.

There are many wireless standards under which wireless devices operate today. Example wireless standards include, but are not limited to, Bluetooth, Digital Enhanced Cordless Telecommunications (DECT), Code Division Multiple Access (CDMA)-2000, Wideband-CDMA (WCDMA), Orthogonal Frequency Division Multiple Access (OFDMA), Wi-Fi, WiMAX, Long Term Evolution (LTE) and so forth.

A wireless communication device that operates in accordance with any one of these standards or another standard can generally receive and transmit electromagnetic signal waves that occupy a portion of the frequency spectrum. Wireless communication devices are generally designed to operate within a particular frequency band so as to avoid interfering with competing electromagnetic signal waves. Different frequency bands offer different advantages and disadvantages for wireless communication. For example, different frequency bands have different propagation and interference characteristics. Moreover, the various wireless standards, which generally correspond to an assigned frequency band or bands, provide for different propagation, interference-resistance, range, throughput, and other characteristics. Generally, no individual frequency band or wireless standard can be optimum for all communications in all situations.

Presently the current method for delivering data to a wireless edge device 101 is shown in FIG. 1 where a radio access node 102 transmits information downlink RF link 103 that uses a RF carrier 104 is able to communicate with the wireless edge device. Similarly the wireless edge device is able to communicate back to the radio access point 102 by means of an uplink RF link 105 using an uplink carrier 106. The uplink and downlink scheme depicted in FIG. 1 could be for Frequency Division Duplex (FDD) or Time Division Duplex (TDD) wireless fixed and or mobile communication systems.

With a multi carrier wireless system for fixed and or mobile communication systems data bandwidth made available for the wireless edge device to utilize can be increased. The amount of increased bandwith made available to the wireless edge device 101 can be increased by making many RF carriers 104, 106 available for the wireless edge device to utilize. For example when using the same radio access scheme and rf channel bandwidth increasing the amount of RF carriers from one to two, in FIG. 2, has the potential of doubling the overall bandwidth that the wireless edge device can utilize. The amount of RF carriers however does not need to be limited two or rely on the same radio access technology or RF bandwidth.

Additionally increasing the amount of RF carriers from one to two or N has the potential of increasing the available bandwidth for the wireless edge device by the amount of RF carriers. Therefore increasing the amount of RF carriers, FIG. 3, the wireless edge device can utilize will improve its potential data bandwidth capabilities as long as it is matched with the appropriate rf access points capability.

Further, the use of multiple carriers may be used in combination with multiple-input multiple-output (MIMO).

However the multi-carrier techniques that are used and proposed rely on similar radio access schemes and use of RF carriers which are within the same pass band of the transmitter of the wireless edge device.

Present radio techniques for a wireless edge device utilize discrete transmitters and receivers or a transceiver 401 for each radio access scheme and frequency band as depicted in FIG. 4. The receiver for the wireless edge device are wideband in nature facilitating mobile desense. The discrete transceiver 401 are connected to the wireless edge devices antenna 404 with the aid of a antenna selector system 403 which limits the selection of the frequency band and radio system utilized. The use of the antenna selector switch 403 also limits the potential for channel aggregation through diverse carriers operating in other frequency bands than the band selected with the antenna selector switch 403.

The use of discrete tranceivers 401 are being replaced with the use of Software defined radios 501 in FIG. 5 are seeing more use in wireless edge devices employing a tunable RF front end and potentially RF transmitters as well. The SDR approach while great has several limitations regarding RF channel aggregation. For instance the tunable filter 503, 506 or duplexer 504 as shown in FIG. 5 limits the ability of the mobile radio to use channel aggregation involving multiple radio bands. The configuration in FIG. 5 can be used for RF channel aggregation however the channels need to be close in RF proximity to each other, preferably adjacent and or alternate RF channels.

It is desired to have a wireless edge device that is capable of channel aggregation using multiple frequency bands and multiple radio access techniques at the same time. Additionally it is desirable to have a wireless access device utilize a multicarrier approach using different radio access points which can use different radio access techniques or different frequency bands at the same time. It is also desired to have a wireless access device be capable of multicarrier operation between multiple radio access points which may be operated by different wireless network operators.

SUMMARY

A method and apparatus for a wireless edge device supporting aggregation of multiple component carriers are disclosed. A wireless edge device may utilize carrier aggregation using the same radio access scheme with different frequency bands and possibly different RF bandwidths. Additionally a wireless edge device can utilize different radio access schemes with different frequency bands. The radio access scheme and the frequency bands that they use may be provided by one wireless network operator or by multiple wireless network operators.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

Figure 3:
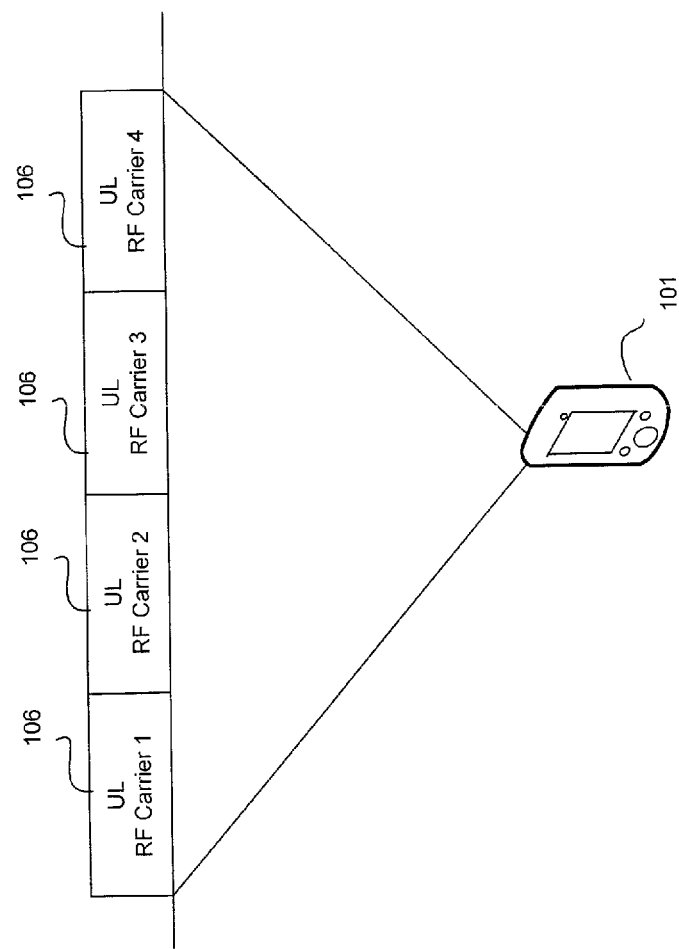
FIG. 3 illustrates Single RAN Multiple Carrier
Figure 4:
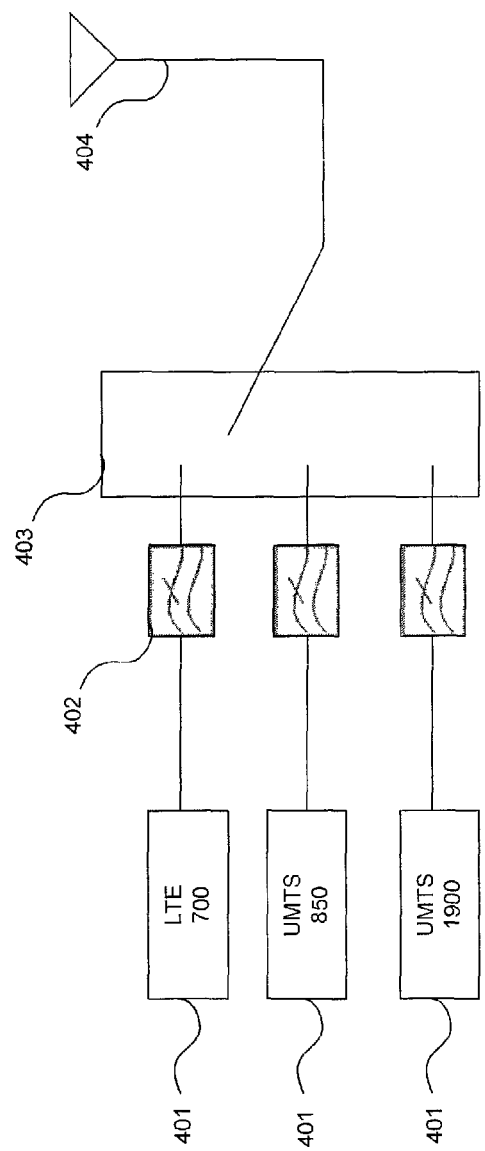
FIG. 4 is illustrates an Antenna Selection Method
Figure 5:
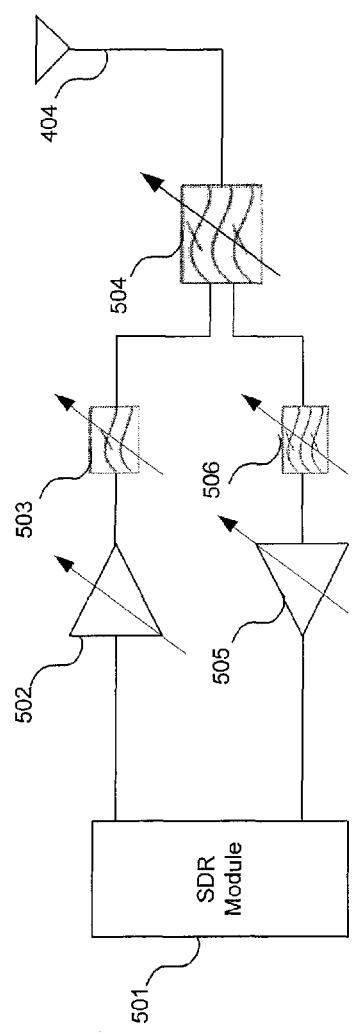
FIG. 5 illustrates a Typical Software Defined Radion (SDR)

As used herein, the terms "cellular telephone," "cell phone" and "mobile device" are used interchangeably and refer to any one of various cellular telephones, wireless modems, personal data assistants (PDA's), palm-top computers, laptop computers with wireless modems, tablet computers with wireless modems, wireless electronic mail receivers (e.g., the Blackberry® and Treo® devices), multimedia Internet enabled cellular telephones (e.g., the iPhone® and Android®), and similar personal electronic devices. A mobile device may include a programmable processor and memory as described in more detail below with reference to FIG. 3. In a preferred embodiment, the mobile device is a cellular handheld device (e.g., a cellphone), which can communicate via a cellular telephone network.

As used herein, the terms "Wireless Network", "Network", "Cellular System", "Cell Tower" and "Radio Access Point" are used interchangeably and refer to any one of various wireless mobile systems. In a preferred embodiment, the Wireless Network is a Radio Access Point or (e.g., a cell tower), which provides the radio link to the mobile device so it can communicate with the core network.

The invention being proposed is different and is meant to support channel aggregation as well as addressing the RF receiver desence that is starting to occur in the wireless industry as more RF bands are being used for wireless mobile communication.

The invention addresses the current technology implementation limitations where a mobile device that is capable of utilizing several different can not aggregate channels across different frequency bands or aggregate different Mobile RAN technologies.

Channel aggregation is described for wireless communication in which exemplary embodiments provide that two or more communication channels can be channel-aggregated as communication channels, including for a single service. As described herein, channel aggregation may include transmitting and receiving data at a wireless communication device on different communication channels in which data from a single service may be assigned for communication on any one of two or more aggregated communication channels as determined by a channel aggregation system. The channel-aggregated communication channels are each individually properly formed communication channels. The channel-aggregated communication channels can be adjacent channels in the same frequency band or non-adjacent channels in the same or different frequency bands.

Although features and concepts of the described systems, methods, devices, media, etc. for channel aggregation can be implemented in any number of different environments, communications systems, processing-based systems, structures, and/or other configurations, exemplary embodiments of channel aggregation are described in the context of the following example systems and environments.

Figure 6:
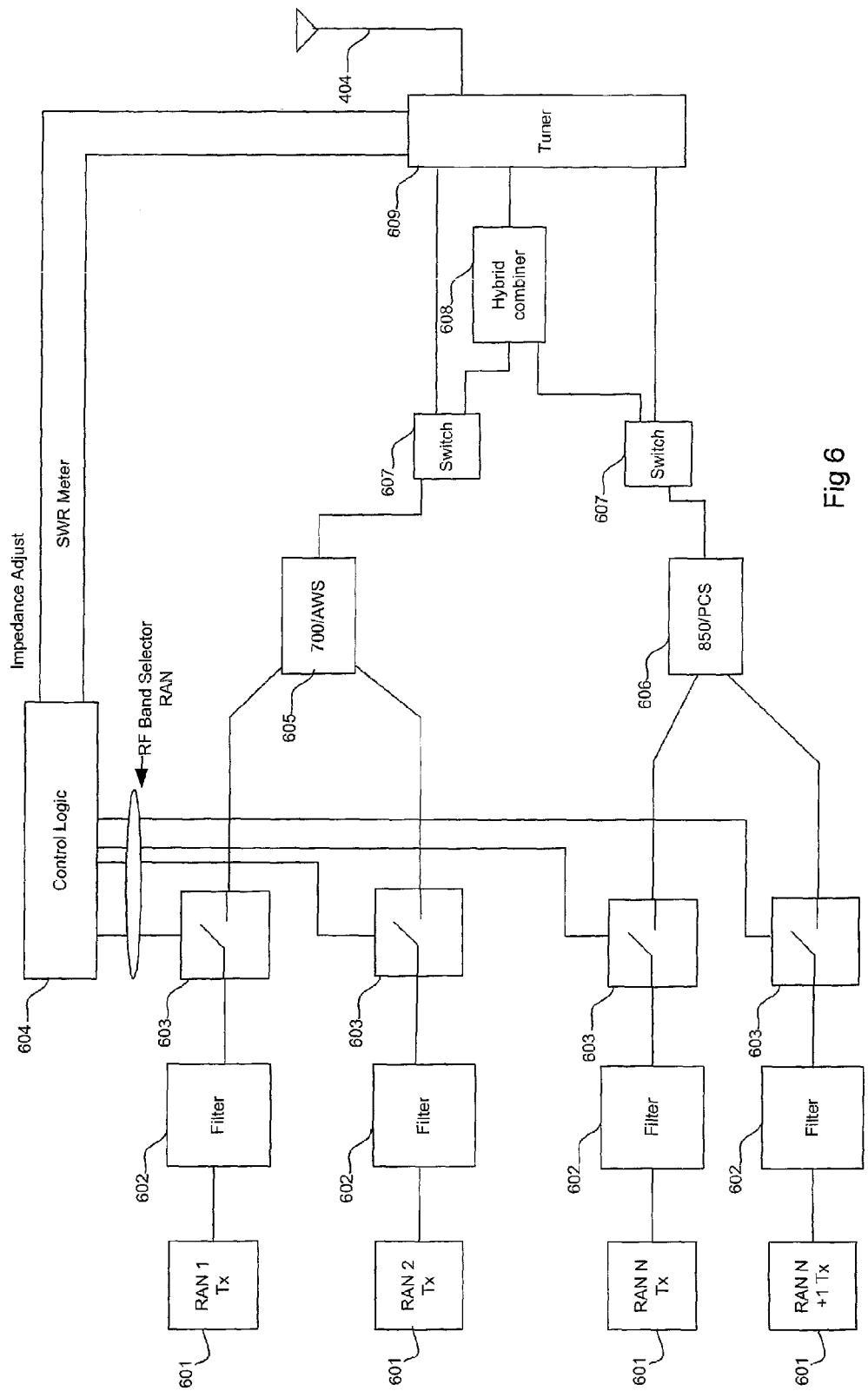
FIG. 6 illustrates a Wireless Edge Device Diverse Carrier Tx Configuration

FIG. 6 depicts a diverse multiple carrier aggregation schemes that uses cross band couplers 605 and 606 for use in bringing together multiple RF technologies and frequency bands of operation. RAN 1 601 could be LTE operating in the 700 MHz upper or lower frequency bands. RAN 1 601 however could also be UMTS or EVDO or any other RAN technology. RAN2 601 can be LTE, UMTS, EVDO or any RAN technology operating in the AWS frequency band. These RAN transmit channels are combined by use of a cross band coupler 605 and 606 which has very low insertion loss.

Switches 607 are included after the cross band coupler to account for the possibility that there may be 3 or 4 or more RF channels aggregated. The switch 607 also if not involving 3 or 4 or more channels being aggregated in different frequency bands will bypass the hybrid combiner 608 reducing insertion loss.

Switches 603 after the filter 602 in FIG. 6 is meant to include the RF signal from the respective RAN. When the switch 603 is in an open position its impedance will look like and open circuit.

It is also possible to not utilize switches 603 if desired.

The tuner 609 in FIG. 6 is meant to address impedance differences that occur when combining different frequency bands onto an antenna 404 and can have a SWR sensor to help fine tune the impedance difference to maximize the transmit power.

The control logic 604 is included in FIG. 6 which controls switches 603 and 607 besides the tuner 609.

Figure 7:
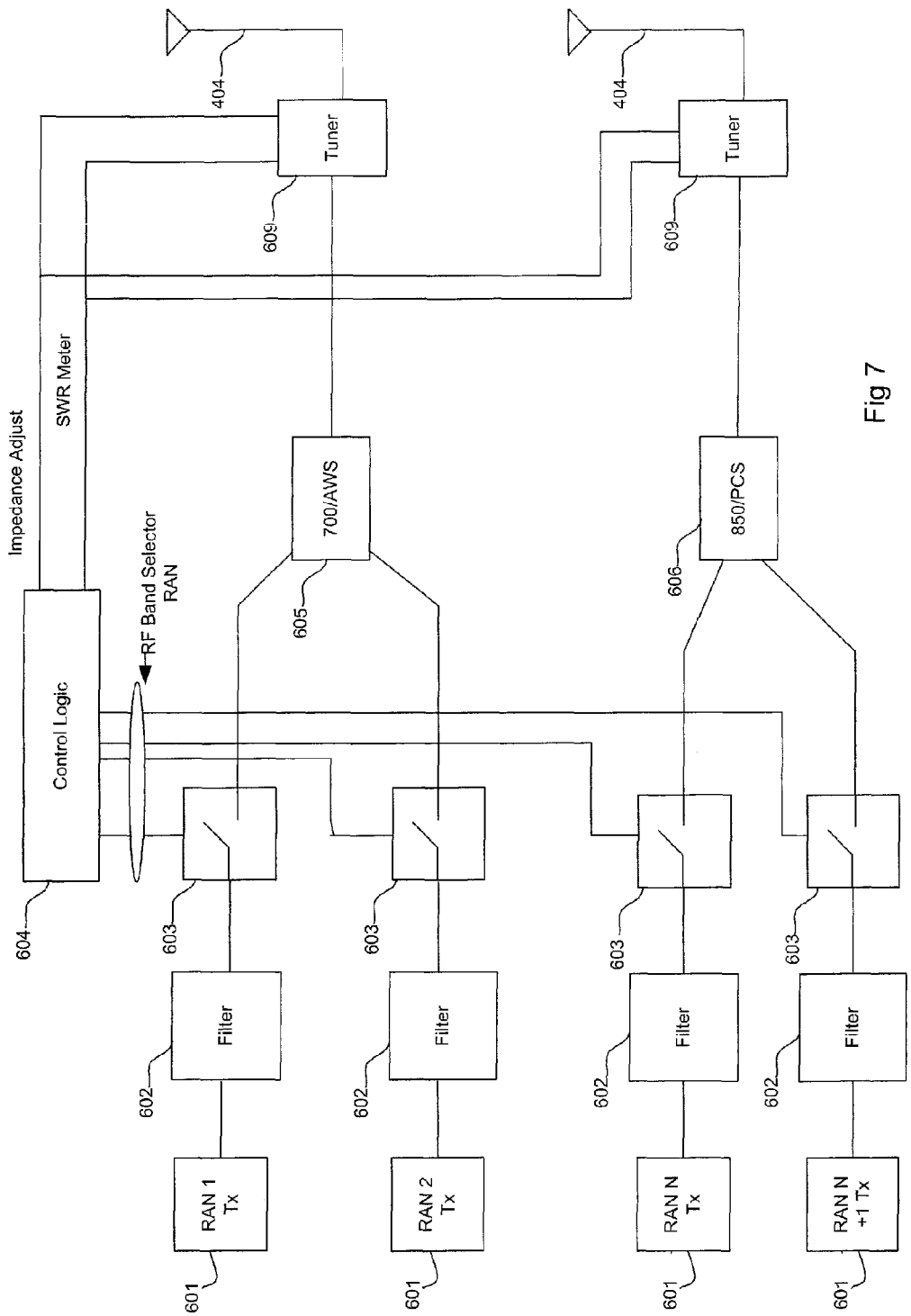
FIG. 7 illustrates a Tx configuration with MIMO Antennas

In another embodiment FIG. 7 shows another configuration for diverse multiple carrier aggregation where the use of two antennas 404 for transmitting is used instead of one. Through this configuration shown in FIG. 7 the need of a hybrid combiner 608 shown in FIG. 6 is not needed thereby improving the combining losses. The use of switches 603 may or may not be utilized depending on impedance and isolation requirements.

Figure 8:
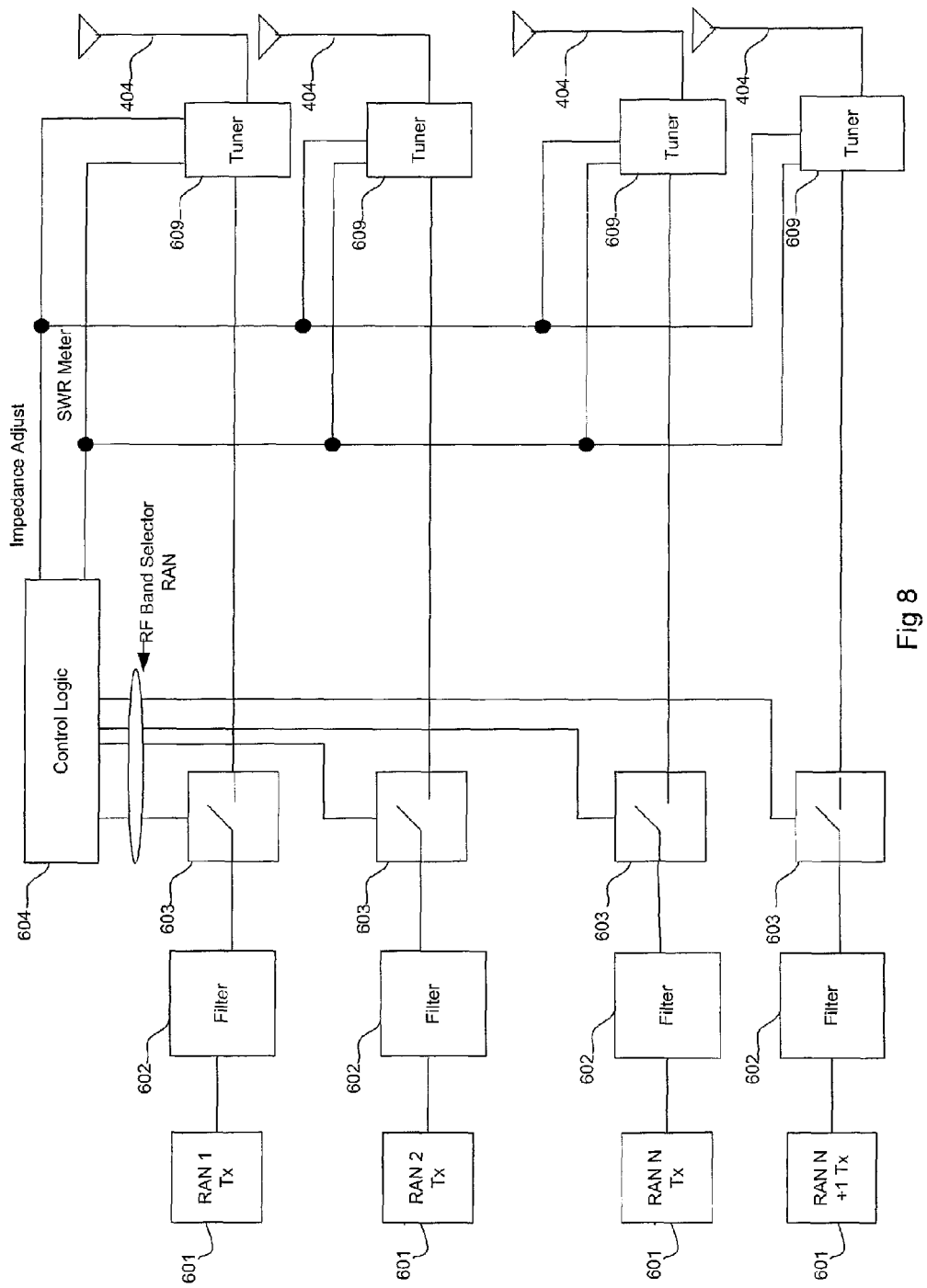
FIG. 8 illustrates a Multiple Output Tx Configuration

FIG. 8 is yet another configuration possible where each individual transceiver 601 is connected to its own antenna 404. This configuration affords the least insertion loss possible and allows for good RF isolation for each transmitter.

Figure 9:
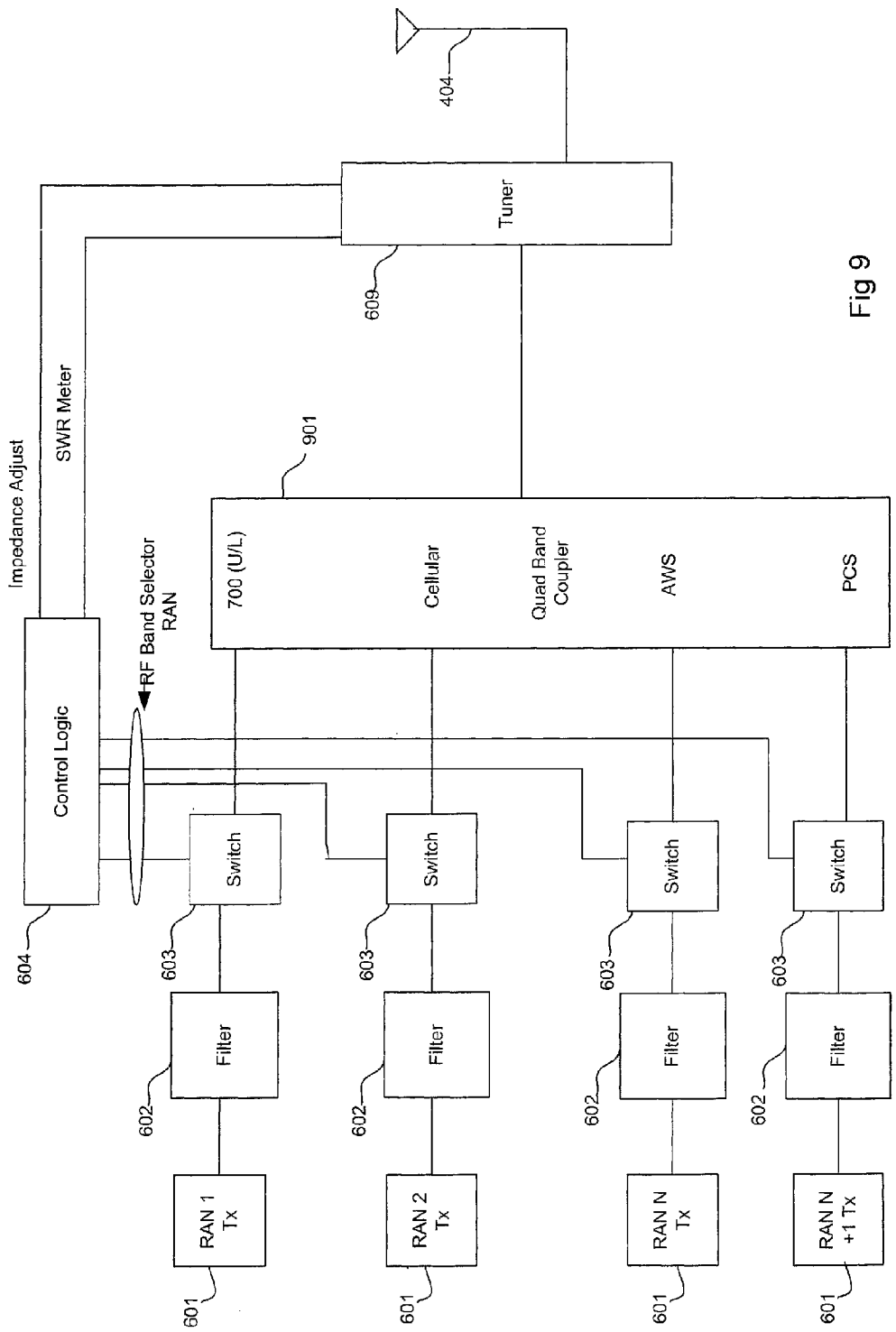
FIG. 9 illustrates a Quad or Multiband Coupler

FIG. 9 is another variant of the channel aggregation method where a quad band or a N-Plexer (N-band coupler) 901 is used to bring multiple RF bands together onto one antenna 404.

Both FIG. 6 and FIG. 9 schemes can apply for each of the transmit antennas that the wireless edge device many have.

Figure 10:
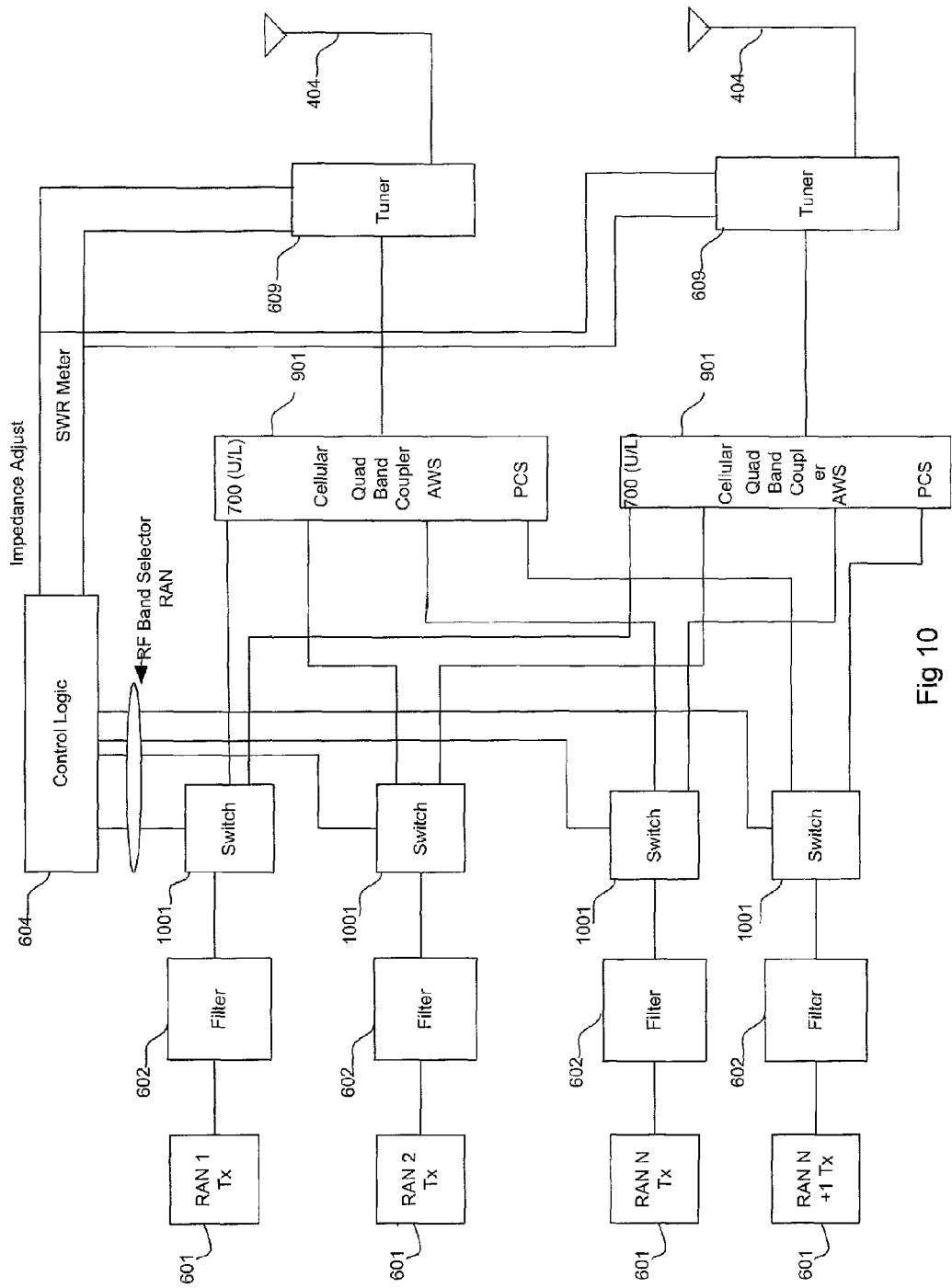
FIG. 10 illustrates a Multiple N Plexer Configuration

FIG. 10 is depicts the possible configuration where several quad band or a N-Plexer (N-band coupler) 901 is used to bring multiple RF bands together onto one antenna 404. This configuration may be required for example when using 700 MHz Upper and Lower bands for diverse multiple carrier aggregation. The switch 1001 in FIG. 10 is meant to select which Tx path the RF signal will take. With Tx diversity the switch will enable both paths to each of the antennas 404 to be utilized.

Figure 11:
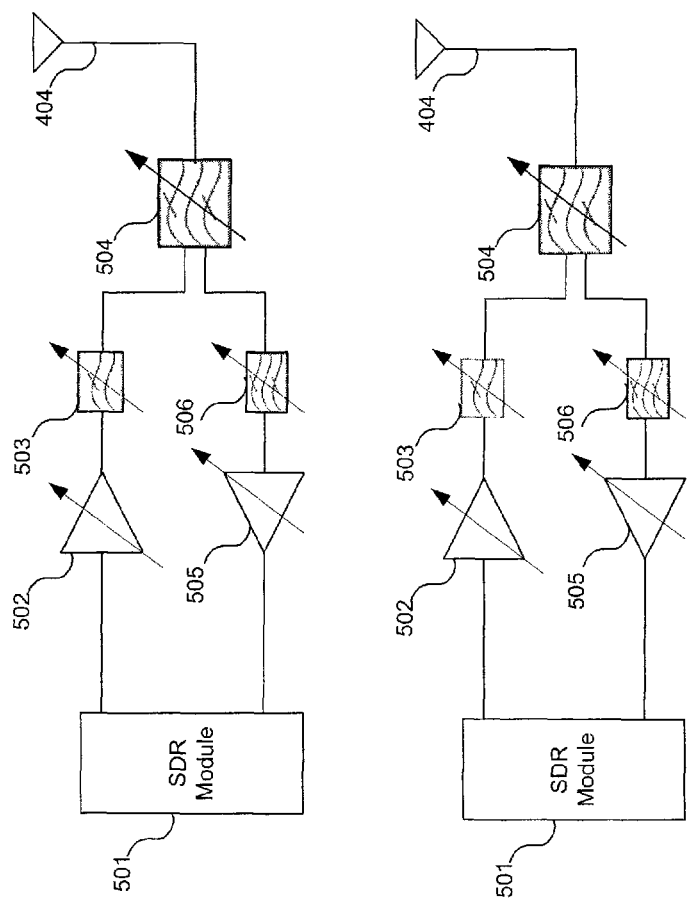
FIG. 11 illustrates Multiple SDR Modules

FIG. 11 shows the use of two distinct Software Defined Modules 501, SDR Transceivers to facilitate diverse multiple carrier aggregation. The SDR modules 501 rely in separate and diverse paths to the antenna 404 for transmission. Although only one receive path is shown in FIG. 11 for each SDR module 501 the use of a second antenna 404 or potentially more antennas for receiving is possible.

Figure 12:
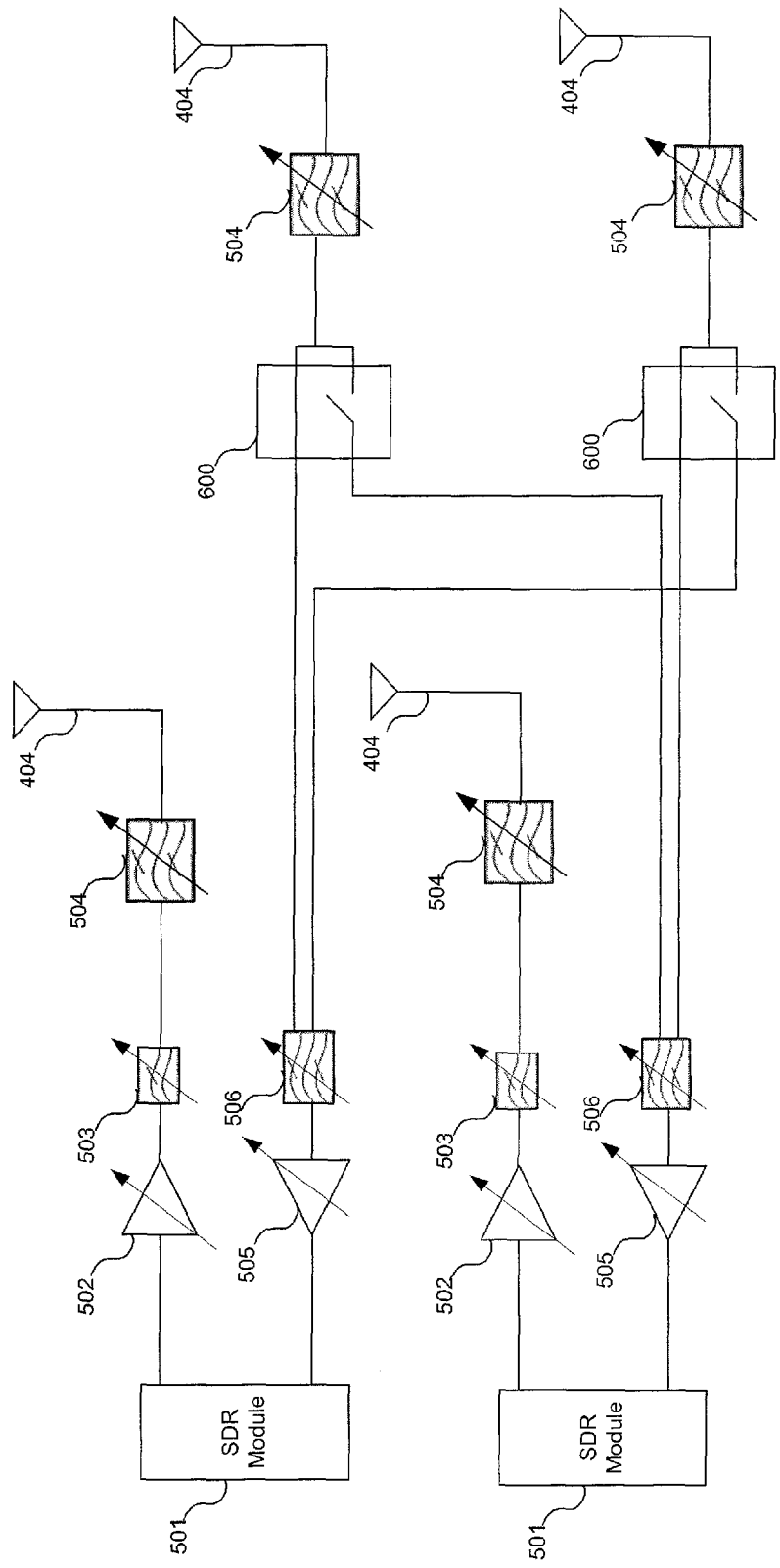
FIG. 12 illustrates SDR Modules with Rx Path selection

FIG. 12 depicts several SDR modules 501 used for diverse multiple carrier aggregation. FIG. 12 shows the use of two distinct Tx paths, one for each SDR module 501. However the receive path to the SDR module 501 is shown coming from one or two different antennas 404. The use of a switch 600 is shown which enables the selection of the antenna 404 to the appropriate SDR module enabling multiple receive paths for the SDR to utilize. The filter 504 is shown between the antenna 404 and switch 600, however the filter 504 can be placed after switch 600 depending on the frequency bands that the wireless edge device 101 is designed to use. Switch 600 can also serve as a cross band coupler as well as having switching capabilities.

Figure 13:
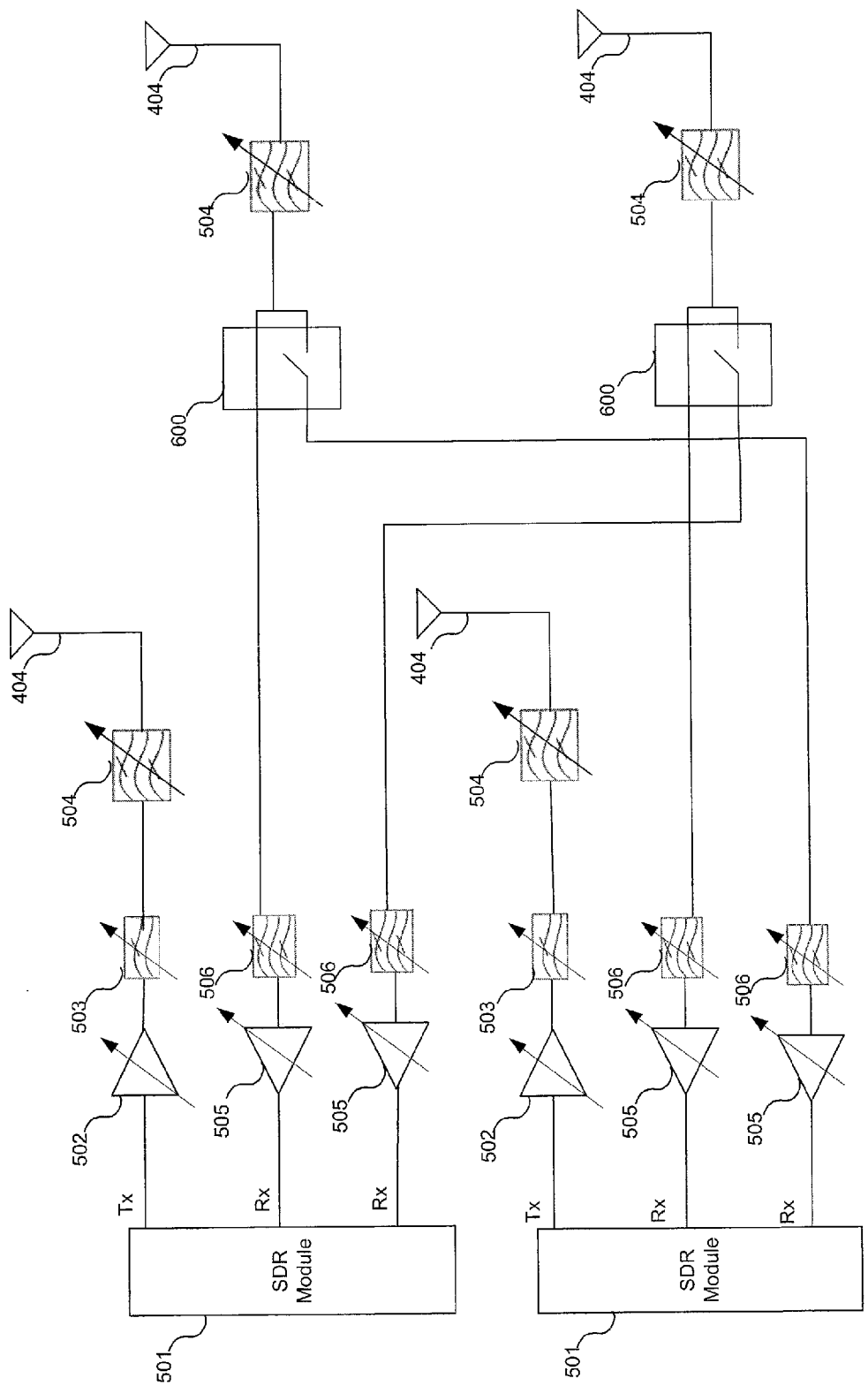
FIG. 13 illustrates SDR Modules with Rx Path selection

FIG. 13 is similar to that of FIG. 12 except in this configuration two distinct RF receive paths are defined and shown in FIG. 13. In FIG. 13 separate Rx filters 506 are shown for each receive path drawn With the proliferation of RF frequency bands a wireless broadband edge device 101 can utilize the RF receiver becomes more susceptible to unwanted energy degrading the receiver performance and possibly desensing the receiver itself.

Figure 14:
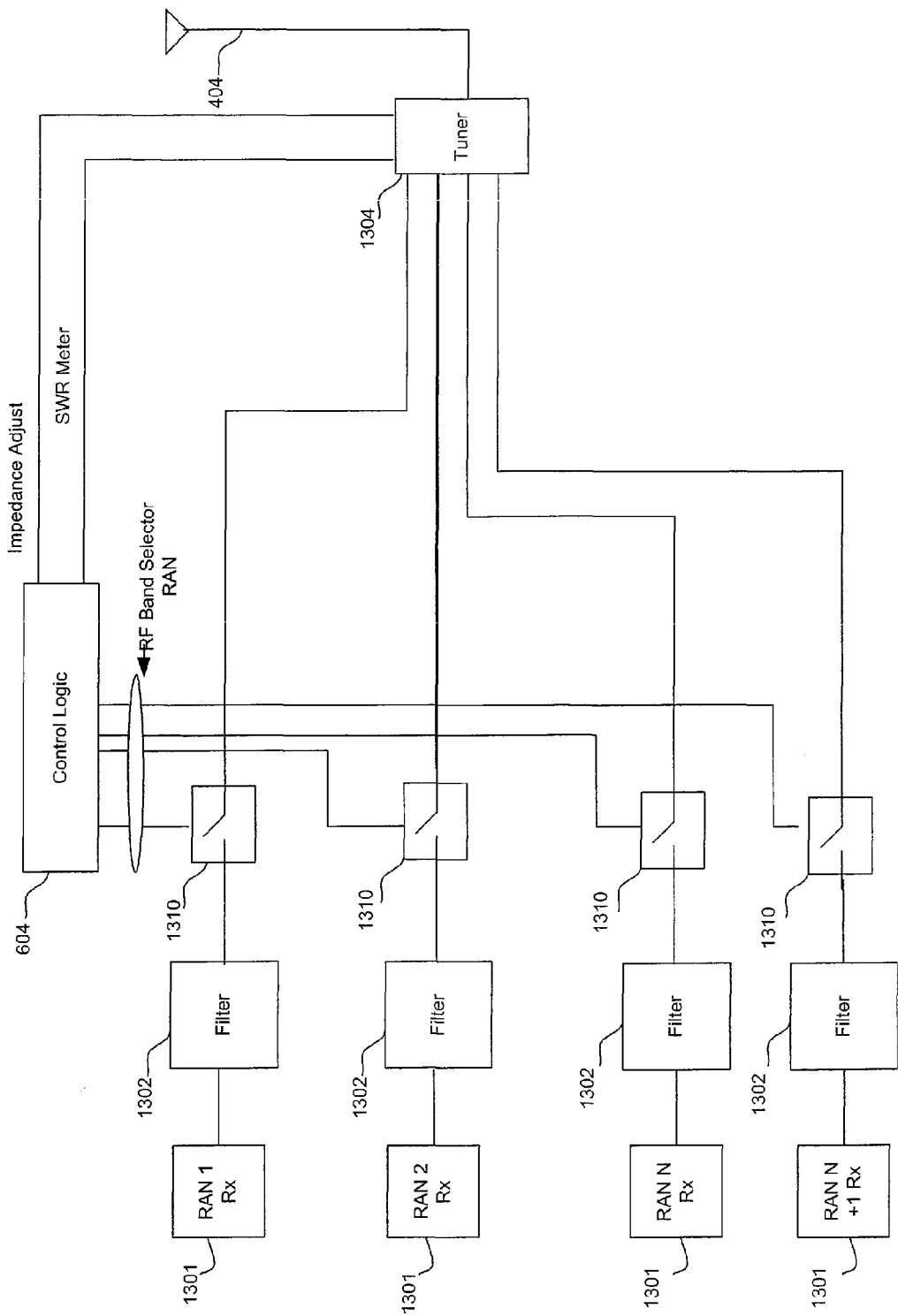
FIG. 14 illustrates a Transceiver Rx Path Selection scheme

FIG. 14 shows a scheme that will reduce the out of band energy that the radio receiver experiences by removing unwanted energy though use of band specific filters for each of the receivers in the wireless broadband edge device 101.

The use of a tuner or rather duplexer 1304 that is connected to an antenna 404 which allows for the RF energy to pass to the respective receiver portion of the transceiver 1301. The use or the selector switch 1310 is meant to isolate the other RF filters 1302 interaction resulting in an increased noise floor due to common signals.

Figure 15:
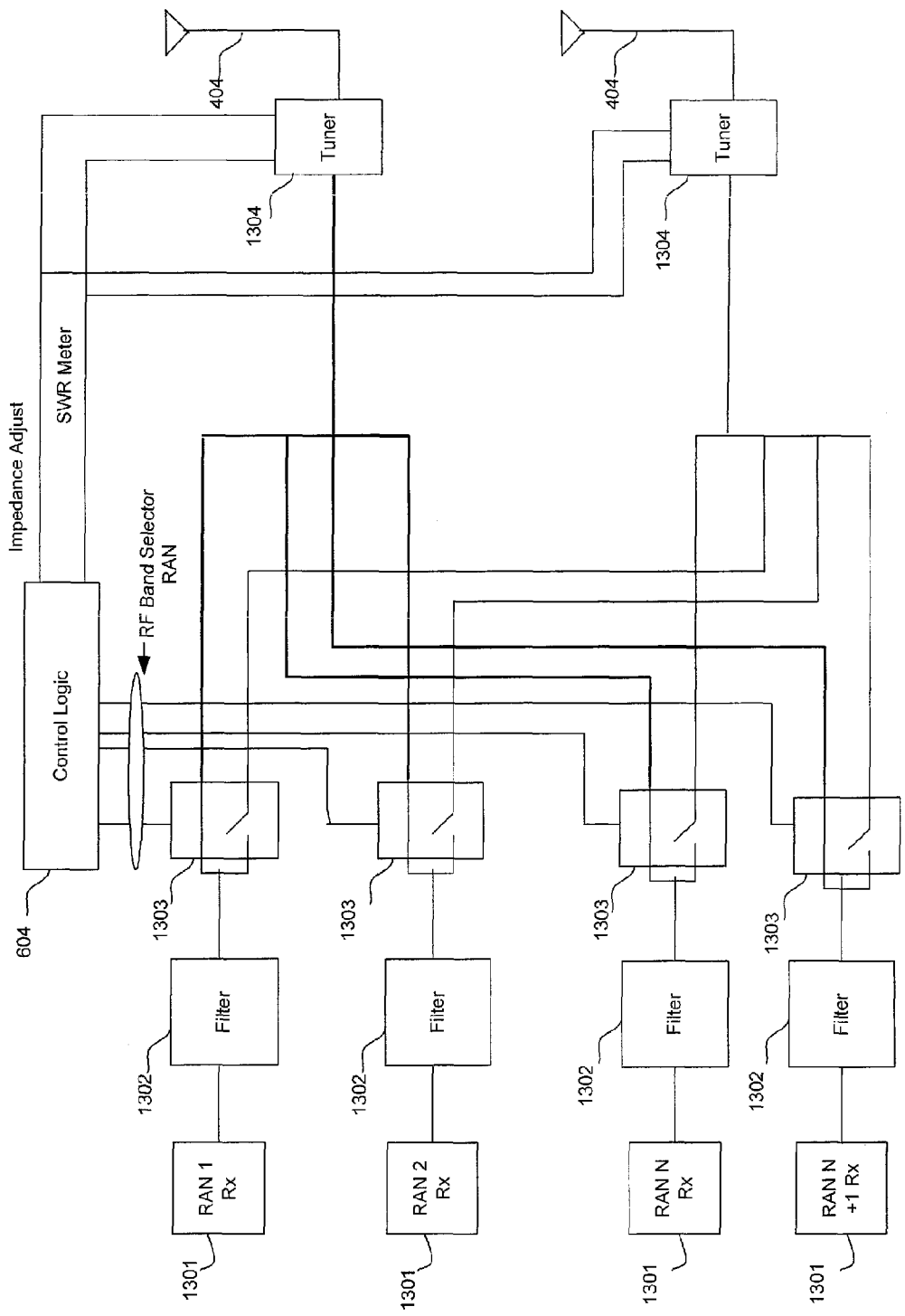
FIG. 15 illustrates a Transceiver Rx Path Selection scheme using multiple antennas

FIG. 15 shows a scheme that will reduce the out of band energy that the radio receiver experiences by removing unwanted energy though use of band specific filters for each of the receivers in the wireless broadband edge device 101. FIG. 15 is different from FIG. 14 in that it utilizes several antennas 404.

Figure 16:
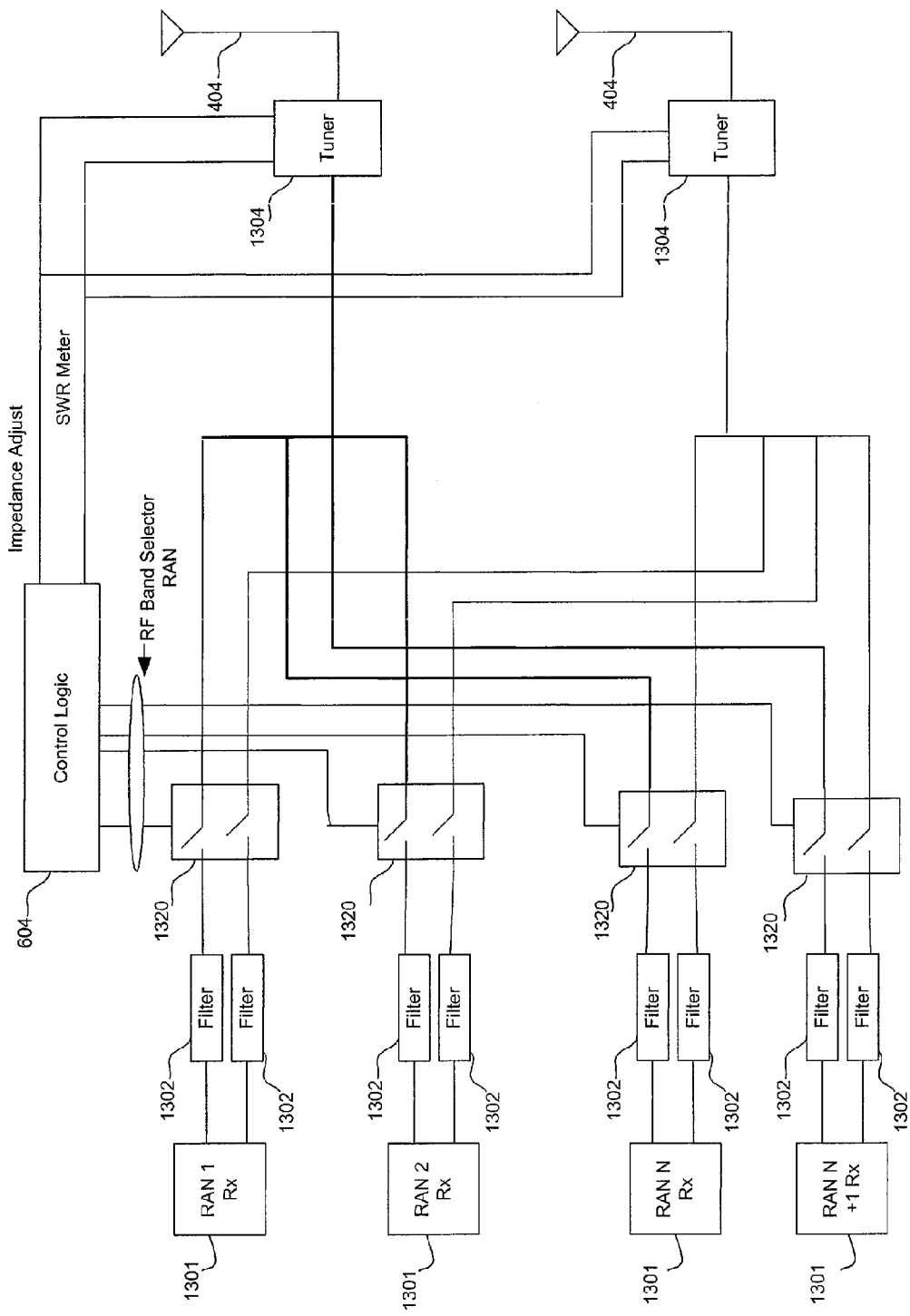
FIG. 16 illustrates a Transceiver Rx Path Selection using multiple antennas and discrete Rx filters that can be static or tunable

FIG. 16 is another variant of the scheme shown in FIG. 15 where each individual RF receive path has its own set of filters 1302 which can be added and removed from the system. The Rx selector switch 1320 is used to select which antenna 404 is utilized by the transceiver receiver 1301. The filter 1301 is capable of being static or tunable thereby enhancing the capability of the wireless broadband edge device for RF selectivity and overall performance across multiple and diverse frequency bands.

Figure 17A:
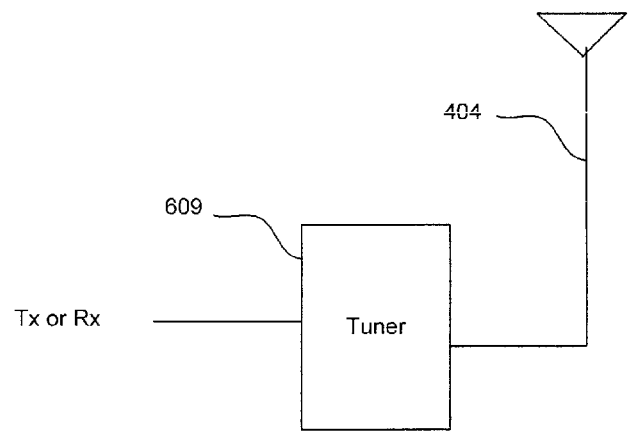
FIGS. 17A and 17B illustrate a Tunable Duplexer
Figure 17B:
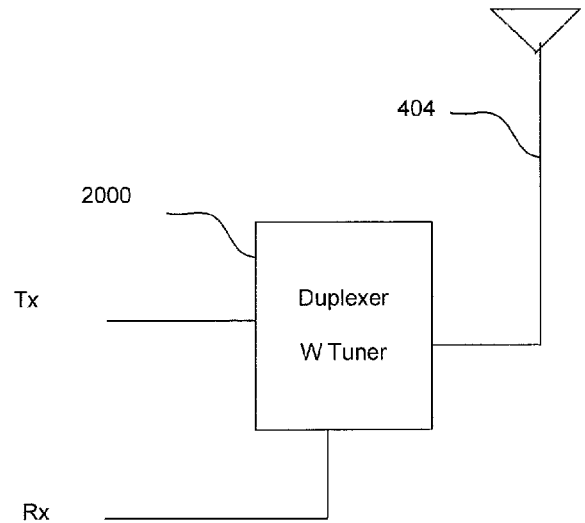

FIG. 17A shows the common tuner 609 shown in many of the diagrams in the proposed invention. The tuner 609 is used to optimally match the antenna 404 with the Transmitter or receiver for the diverse multiple carriers that the wireless broadband edge device may utilize. However FIG. 17B is a further refinement in that a duplexer that has impedance tuning capability 2000. The purpose of the duplexer is to utilize a particular antenna 404 for both transmission and reception of the RF energy minimizing the amount of antennas required for a wireless broadband edge device.

Additionally the use of a duplexer 2000 that is tunable enables more configuration options and opportunities for diverse multiple carrier aggregation applications.

In FIGS. 6,7,8,9,10,14,15 and 16 the use of a tunable duplexer 2000 can be used instead of or with the tuner 609.

Figure 1:
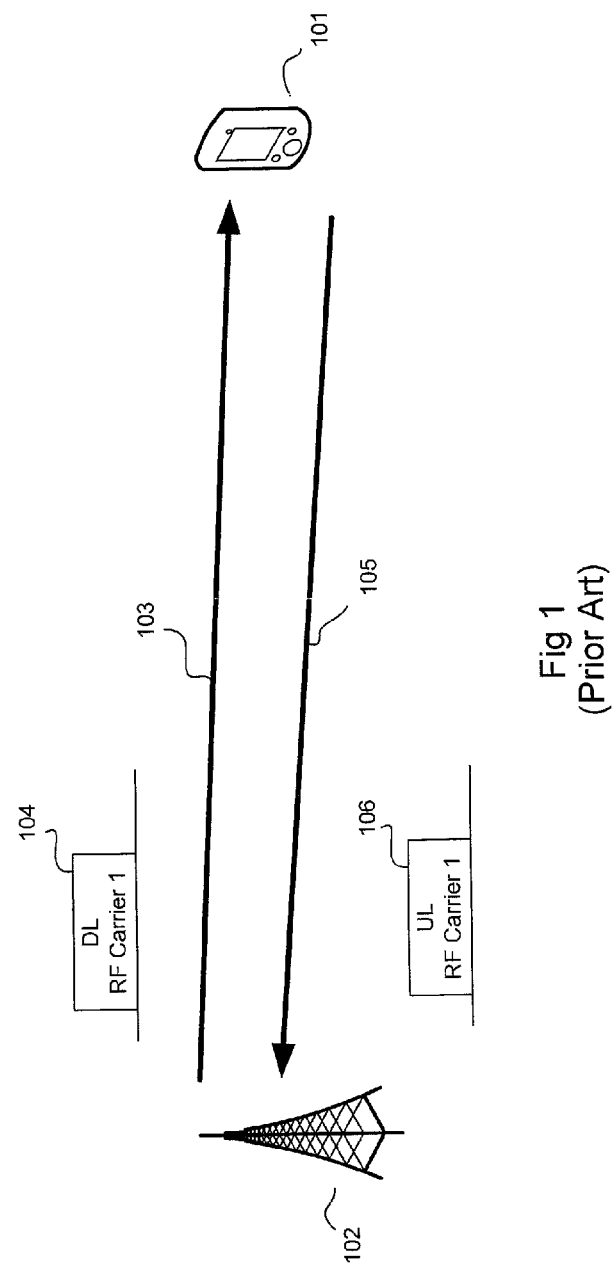
FIG. 1 illustrates No Carrier Aggregation
Figure 2:
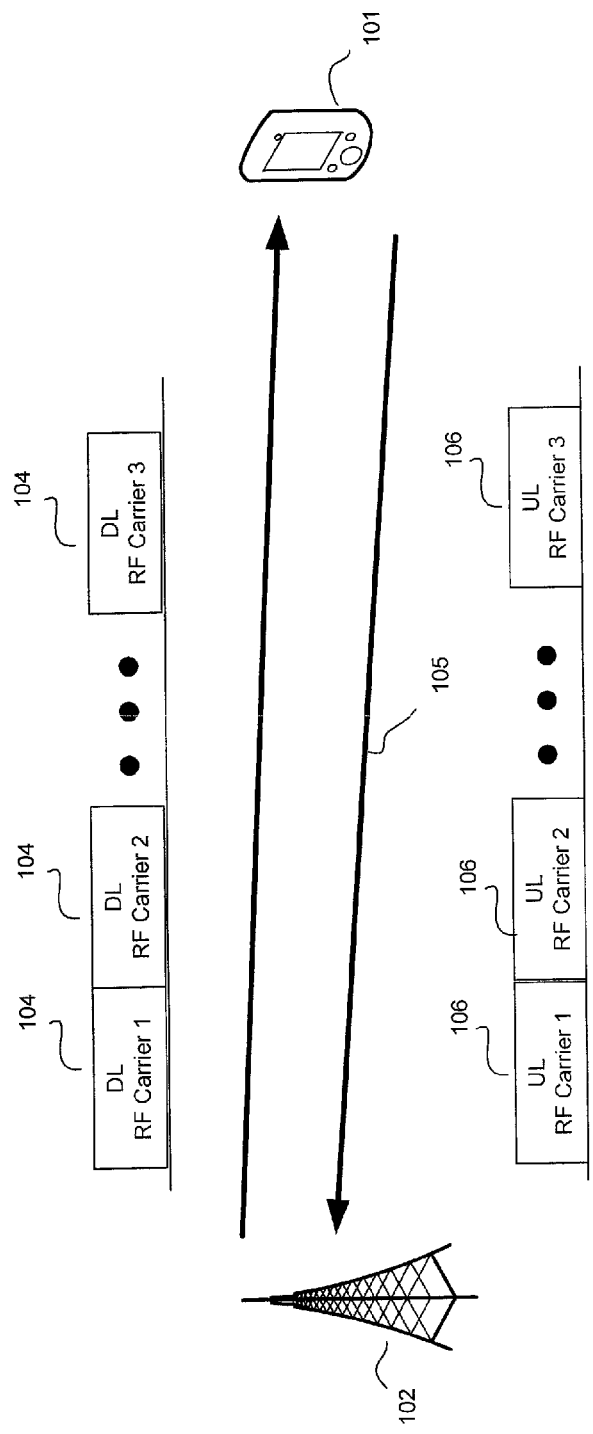
FIG. 2 illustrates Carrier Aggregation

Referring to FIG. 1, a wireless broadband edge device 101 will typically include a processor coupled to a random access memory and a wireless transceiver coupled to an antenna for sending and receiving voice and data calls via a wireless broadband network. Typical wireless broadband edge devices may also include a rechargeable battery which provides power to the processor and transceiver, allowing the unit to be portable. The wireless broadband edge device may also include components typically employed in commercial cell phones, including a display, a keyboard, a pointing device and a parallel or serial bus connector, all coupled to the processor. The wireless broadband edge devices may also include a mass storage device coupled to the processor and random access memory, which may contain large amounts of data. The mass storage device or random access memory may contain the provisioning/programming information for mobile device operation.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The hardware used to implement the forgoing embodiments may be processing elements and memory elements configured to execute a set of instructions, wherein the set of instructions are for performing method steps corresponding to the above methods. Alternatively, some steps or methods may be performed by circuitry that is specific to a given function.

Those of ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, firmware, or software depends upon the particular application and design constraints imposed on the overall system. Those of ordinary skill in the art may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile device are intended to encompass any one or all memory modules within the mobile device without limitation to a particular configuration, type, or packaging. An exemplary storage medium is coupled to a processor in the mobile device such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A wireless device comprising:
an antenna;
a plurality of transmitters, at least two of which operate in different frequency bands; and
a hybrid combiner configured to:
accept carrier signals at different frequency bands;
combine the carrier signals into a combined carrier signal;
provide the combined carrier signal to the antenna for transmission; and
receive multiple carrier signals in different frequency bands from multiple wireless base station transmitters.

2. The wireless device of claim 1 further comprising:
a tuner configured in a wireless handset to attempt to match the combined signal from the hybrid combiner to the antenna for transmitting the composite carrier and receiving multiple carriers.

3. The wireless device of claim 1 further comprising:
a tunable duplexer configured in a wireless handset to attempt to match the combined signal from the hybrid combiner to the antenna for transmitting the composite carrier and receiving multiple carriers.

4. The wireless device of claim 1, wherein the wireless device comprises a first plurality of transmitters of a first frequency band, and wherein the wireless device further comprises a first cross band coupler configured to combine signals from the first plurality of transmitters of the first frequency band and provide that combined signal to the hybrid combiner.

5. The wireless device of claim 4, wherein the wireless device comprises a second plurality of transmitters of a second frequency band, and wherein the wireless device further comprises a second cross band coupler configured to combine signals from the second plurality of transmitters of the second frequency band and provide that combined signal to the hybrid combiner.

6. The wireless device of claim 1, wherein the at least two of the plurality of transmitters that operate in different frequency bands use different radio access techniques.

7. The wireless device of claim 6, wherein the different radio access techniques include one or more of the following: LTE, UMTS, and EVDO.

8. The wireless device of claim 1, wherein the at least two of the plurality of transmitters comprises at least three transmitters.

9. The wireless device of claim 1 further comprising at least one switch configured to bypass the hybrid combiner based on an amount of RF carriers and their frequency bands that need to be combined.

10. The wireless device of claim 1 further comprising a receiver subsystem comprising:
a second antenna;
a plurality of receivers, at least two of which operate in different frequency bands;
a plurality of band pass filters, wherein each band pass filter is paired with a receiver operating in a corresponding frequency band; and
a plurality of selectable switches configured to switch a signal received by the second antenna to the appropriate band pass filter and receiver used to reduce out-of-band energy to improve receiver performance.

11. The wireless device of claim 10 further comprising a tuner in communication with the second antenna.

12. The wireless device of claim 10 further comprising a tunable duplexer in communication with the second antenna.

13. The wireless device of claim 1, wherein the plurality of transmitters use same or different radio access protocols, and wherein the multiple carrier signals are received from the multiple wireless base station transmitters using the same or different radio access protocols.

14. The wireless device of claim 1 wherein the hybrid combiner is configured to combine the carrier signals into the combined carrier signal without filtering the combined carrier signals.

15. A wireless device comprising:
an antenna;
a plurality of transmitters, each operating in a different frequency band; and
an N-plexer configured to:
   accept carrier signals at three or more different frequency bands;
   combine the carrier signals from the three or more different frequency bands into a combined carrier signal;
   provide the combined carrier signal to the antenna for transmission; and
   receive multiple carrier signals in three or more different frequency bands from multiple wireless base station transmitters.

16. The wireless device of claim 15 further comprising:
a tuner configured to attempt to match the combined signal from the N-plexer to the antenna.

17. The wireless device of claim 15 further comprising:
a tunable duplexer configured to attempt to match the combined signal from the N-plexer to the antenna.

18. The wireless device of claim 15, wherein the at least two of the plurality of transmitters that operate in different frequency bands use different radio access techniques.

19. The wireless device of claim 18, wherein the different radio access techniques include one or more of the following: LTE, UMTS, and EVDO.

20. The wireless device of claim 15, wherein the at least two of the plurality of transmitters comprises at least three transmitters.

21. The wireless device of claim 15 further comprising a receiver subsystem comprising:
a second antenna;
a plurality of receivers, at least two of which operate in different frequency bands;
a plurality of band pass filters, wherein each band pass filter is paired with a receiver operating in a corresponding frequency band; and
a plurality of switches configured to switch a signal received by the second antenna to the appropriate band pass filter and receiver.

22. The wireless device of claim 21 further comprising a tuner in communication with the second antenna.

23. The wireless device of claim 21 further comprising a tunable duplexer in communication with the second antenna.

24. The wireless device of claim 15, wherein the plurality of transmitters use same or different radio access protocols, and wherein the multiple carrier signals are received from the multiple wireless base station transmitters using the same or different radio access protocols.

25. A method for multiple carrier aggregation in a wireless device, the method comprising:
performing the following in a wireless device:
   generating carrier signals at three or more different frequency bands;
   combining the carrier signals from the three or more different frequency bands into a combined carrier signal;
   providing the combined carrier signal to an antenna for transmission; and
   receiving multiple carrier signals in three or more different frequency bands from multiple wireless base station transmitters.

26. The method of claim 25, wherein the carrier signals are combined using a hybrid combiner.

27. The method of claim 25, wherein the carrier signals are combined using an N-plexer.

28. The method of claim 25 further comprising attempting to match the combined carrier signal to the antenna.

29. The method of claim 25, wherein the carrier signals use different radio access techniques.

30. The method of claim 29, wherein the different radio access techniques include one or more of the following: LTE, UMTS, and EVDO.

31. The method of claim 25, wherein the plurality of transmitters use same or different radio access protocols, and wherein the multiple carrier signals are received from the multiple wireless base station transmitters using the same or different radio access protocols.

* * * * *